United States Patent [19]

Gikis et al.

[11] 4,416,764
[45] Nov. 22, 1983

[54] METHOD AND APPRATUS FOR EXTRACTING TAR SAND

[75] Inventors: Benjamin J. Gikis, Los Altos Hills; Abner Y. Jones, Menlo Park; Rudolf Elbrecht, Los Altos, all of Calif.

[73] Assignee: Natomas Energy Company, San Francisco, Calif.

[21] Appl. No.: 211,087

[22] Filed: Nov. 28, 1980

[51] Int. Cl.³ .......................... B03B 5/36; C10G 1/04; C10C 1/18; B01D 11/02
[52] U.S. Cl. ............................ 208/11 LE; 196/14.52; 422/269; 422/276; 422/281; 422/283; 210/634; 210/801; 210/803; 210/208; 210/519; 210/523; 209/158
[58] Field of Search ............... 210/800, 801, 523, 407, 210/208, 519; 208/11 R, 11 LE; 209/156, 157, 461, 463, 464, 18, 158, 159, 160, 161; 196/14.52

[56] References Cited

U.S. PATENT DOCUMENTS

| | | | |
|---|---|---|---|
| 1,339,682 | 5/1920 | Allen | 210/801 |
| 1,339,683 | 5/1920 | Allen | 210/801 |
| 2,140,059 | 12/1938 | Simonsen | 210/519 |
| 2,894,637 | 7/1959 | Schreiber | 210/519 |
| 3,295,677 | 1/1967 | Condolion | 209/157 |
| 3,351,195 | 11/1967 | Hubbi | 209/157 |
| 3,357,555 | 12/1967 | Garland | 209/157 |
| 3,523,889 | 8/1970 | Eis | 210/519 |
| 3,935,076 | 1/1976 | Cymbalisty | 208/11 LE |
| 4,052,311 | 10/1977 | Martin | 210/523 |
| 4,055,494 | 10/1977 | Emmett | 210/208 |
| 4,120,775 | 10/1978 | Murray et al. | 208/11 |
| 4,274,963 | 6/1981 | Pyrus | 210/523 |
| 4,278,541 | 7/1981 | Eis | 210/519 |

FOREIGN PATENT DOCUMENTS 925993 1/1960 United Kingdom ............... 210/519

Primary Examiner—Ernest G. Therkorn
Attorney, Agent, or Firm—Edward B. Gregg; Donovan J. DeWitt

[57] ABSTRACT

Method and apparatus for separating coarse sand particles from fine sand particles in a slurry of sand and a solution such as results from the solvent extraction of tar sand, such method comprising causing flow of such slurry in a generally horizontal direction and then causing upward flow at a rate such that coarse particles settle out and fine particles move upwardly to a slurry outlet. The apparatus preferably comprises a tubular duct for downward flow, bottom openings in the duct for outward flow, a lower receptacle for coarse particles and an annular space surrounding the duct for upward flow of slurry of solution and fine sand particles.

11 Claims, 3 Drawing Figures

METHOD AND APPRATUS FOR EXTRACTING TAR SAND

This invention relates to the extraction of tar from tar sand and more particularly to a method of separating coarse particles of sand from fine particles in a mixture or slurry resulting from solvent extraction of tar sand.

In Murray and Gikis U.S. Pat. No. 4,120,775 an apparatus and a method are described for the purpose of extracting tar from tar sand. In accordance with that method and apparatus tar sand is mixed with a solvent such as a hydrocarbon having a suitable solvent capacity for the tar, a suitable viscosity for handling and a suitable boiling point to recover the solvent and separate it from the extracted tar. In the method and apparatus described in the Murray and Gikis patent a mixture or slurry of sand and tar solution in such a solvent is caused to pass in a generally horizontal path over a bottom opening such that coarse particles of sand drop through the opening into a chamber from which they are removed and the fine particles pass forwardly with the solution beyond the opening. The slurry of fine particles and solution is subjected to a suitable separation process as, for example in a centrifuge, to separate the fine particles of sand. The solvent is recovered by distillation leaving a residue of the extracted tar which can be refined to produce useful hydrocarbon products, petrochemicals and the like.

An object of the present invention is to improve upon the method and apparatus of the aforesaid Murray and Gikis patent.

Certain embodiments of the invention are illustrated by way of example in the accompanying drawings, in which.

Figure 1:
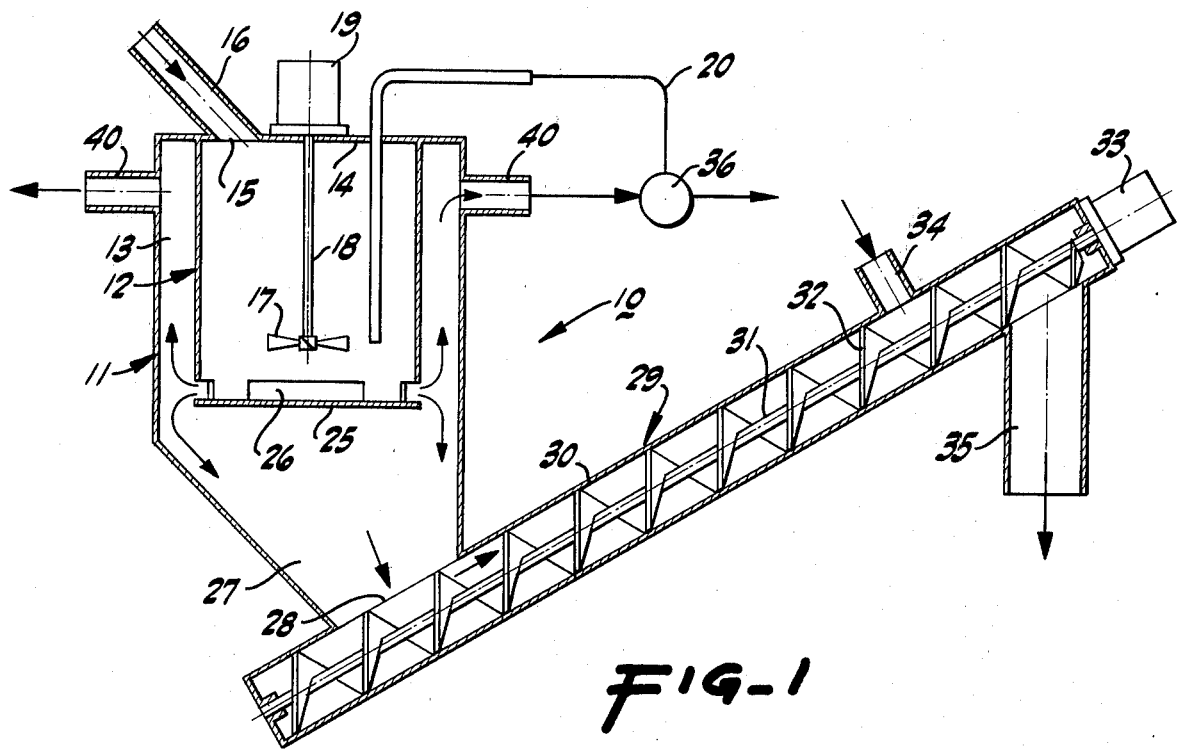
FIG. 1 is a diagrammatic view of one form of apparatus.

Referring to FIG. 1 of the drawings the apparatus is generally designated by the reference numeral 10 and it comprises a tank or vessel 11, usually of cylindrical shape but which may be of any other suitable shape. Within the vessel 11 there is an inner vessel 12 which is separated from the interior wall of the outer vessel 11 to provide an annular space 13. Both vessel 11 and vessel 12 are preferably cylindrical and concentric such that the annular space 13 is circular. However, other configurations may be provided.

The inner vessel 12 is provided with a top cover 14 formed with an opening 15 to which an inlet duct 16 leads for input of tar sand which may flow by gravity or any other suitable feeder. An agitator, illustrated by a paddle 17, is provided which is fixed to the lower end of a shaft 18 which is driven by a motor 19. A duct 20 is provided for recycling a portion of the solution of tar as described hereinafter. The vessel 12 is provided with a bottom closure 25. Above and flush with the bottom 25 are several peripheral openings 26. Preferably these openings are spaced equi-angularly about the central axis of the inner vessel 12 and they communicate with the annular space 13 at the bottom thereof. If an accumulation of sand on the bottom 25 can be tolerated the openings 26 may be spaced above the bottom 25 but it is preferred that the bottom edges of the openings 26 be flush with the upper surface of the bottom 25 so that there is no dead space for accumulation of sand. The bottom 25 is preferably imperforate although openings in the bottom smaller than the finest particles of sand may be tolerated.

The vessel 12 and agitation means therein perform the function of mixing tar sand with solvent and forming a slurry of sand and a solution of tar. However, such operation may be carried out in other equipment and performed slurry may be fed to vessel 12 in which case it acts only or primarily as a duct. It is preferred to form the slurry of sand and solution in vessel 12.

The outer vessel 11 extends downwardly below the inner vessel 12, having a tapered shape as shown although other shapes may be employed. This provides a settling basin or chamber 27 for coarse particles of sand and has a bottom opening 28 communicating with a screw conveyor 29 comprising a tube 30, shaft 31 and a helical screw 32 driven by a motor 33. An inlet 34 is provided through which solvent may be introduced and an outlet 35 is provided through which coarse sand separated from the slurry is removed. The sand leaving through conduit 35 may be further processed as described in the aforesaid Murray and Gikis patent and a heat saving method may be provided as described in Murray and Gikis U.S. Pat. No. 4,176,465. The solvent introduced through inlet 34 provides the input of fresh solvent. A portion of the solution is recycled from settling basin 27 by a pump 36 to the vessel 12. This recycled portion will contain fines. This recycling serves to maintain a desirable concentration of dissolved tar and a desirable viscosity in the vessel 12 and to control velocity of liquid in the annular space 13.

In accordance with the present invention, the apparatus illustrated in FIG. 1 and described above is operated so that the slurry of sand and solution formed in or introduced into vessel 12 is caused to flow radially outwardly from the bottom of the inner vessel 12 through the openings 26 into the lower portion of the annular space 13. The solution together with fine particles of sand will flow upwardly through this annular space and outwardly through outlet conduits 40, two of which are shown. A single conduit may be employed but preferably several are employed which are distributed equi-angularly about the annular space 13 so that outflow is uniform.

The effluent slurry of solution and suspended solids is treated in suitable equipment (not shown) to separate solids by centrifuging and to distill the solvent from the tar. The recovered solvent is returned to the system through duct 34.

The flow rates are adjusted so that coarse particles of sand will sink into the basin 27 and thence into the conveyor 29, whereas the fine particles will be carried upwardly through the annular space 13 and out through the conduits 40.

By this means an effective and efficient separation of coarser particles of sand (which sink into the basin portion 27 and are removed by the screw conveyor 29) from the finer particles which leave the apparatus through the conduits 40. A sharp and efficient separation of particles can thus be provided. The point of separation with respect to coarse and fine particles can be adjusted by the rates of solvent recycle of slurry through conduit 20 and of solvent through duct 34, also by the geometry of the annular space 13.

Figure 2:
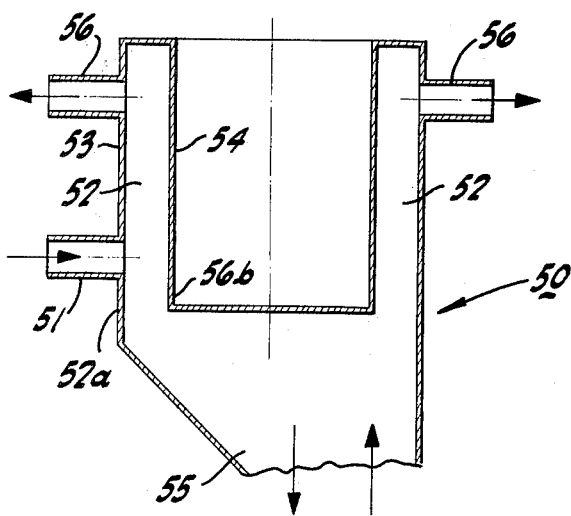
FIG. 2 is a fragmentary view of an alternative apparatus.

Referring now to FIG. 2 an alternative method and apparatus are illustrated in which the slurry of solution and sand are introduced horizontally. The apparatus is designated generally as 50 and it comprises a horizontal duct 51 through which a preformed slurry of sand and solution of tar extracted from the sand is introduced into a vertical duct 52 formed by walls 53 and 54. The duct 52 may be annular and there may be a number of entry ducts 51 distributed angularly about the annular duct 52. The walls of duct 54 extend downwardly at 52a and 52b and lead into a settling chamber 55 which serves the same function as the settling chamber 27 in FIG. 1. One or more suitable outlets 56 for the slurry of solution and fine sand particles are provided. The processing of this slurry, the processing of the coarse particles of sand, the input of fresh solvent and recycling of slurry may be carried out as described above in connection with FIG. 1.

Figure 3:
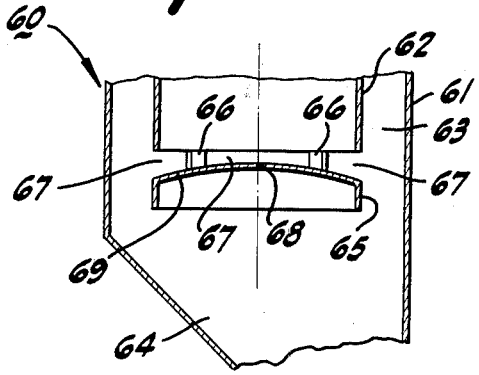
FIG. 3 is a fragmentary view of a preferred variant of the apparatus of FIG. 1.

Referring now to FIG. 3, apparatus similar to that of FIG. 1 is shown including agitation means and other equipment not shown. The apparatus is generally designated by the reference numeral 60 and it comprises an outer vessel 61 and an inner vessel 62 forming between them an annular passage 63. A settling basin 64 is also provided. Except for the modifications to be presently described the apparatus of FIG. 3 may be the same as the apparatus in FIG. 1. The bottom portion 65 of inner vessel 62 is attached to the upper portion of the vessel 62 by brackets 66. Between the brackets are openings 67 for outflow of slurry. The bottom portion 65 extends below these openings a suitable distance. The top surface of the bottom portion 65, that is to say, the surface which is exposed to the slurry in the inner vessel 62, is conical or dome shaped having an apex 68 and sloping sides 69 which provide a smooth downward gradient into the annular space or duct 63, such that sand will slide smoothly down into the duct and turbulence and eddy currents are avoided. Such quiet, non-turbulent flow assists in efficient separation of coarse and fine particles of sand.

The method and apparatus of the invention are also applicable generally to size or density separation of mineral particles in a liquid, e.g. water, although the most useful application of the invention is the separation of coarse from fine sand particles in slurries resulting from solvent extraction of tar sand.

It will therefore be apparent that novel and improved apparatus and method have been provided for separating coarse sand particles from fine sand particles in connection with the extraction of tar from tar sands, also in connection with other slurries.

We claim:

1. A method of treating a mixture of sand and a solution of bitumen in a solvent, such mixture resulting from the extraction of tar sand with the solvent, the sand containing coarse particles and fine particles, such method comprising:
    (a) providing an upwardly directed flow passage having an open bottom and having an outlet above and spaced from an open bottom,
    (b) causing such mixture to flow in a substantially horizontal direction into such passage above its open bottom and below its outlet,
    (c) causing upward flow of solution through such passage and through its outlet, and
    (d) maintaining such flow at a rate such that coarse particles of sand will sink through the open bottom of the passage and fine particles of sand will travel with the solution through the passage and its outlet.

2. The method of claim 1 wherein a receptacle is provided beneath the open bottom of the flow passage to receive the coarse sand which settles through the open bottom.

3. The method of claim 2 wherein a conveyor is provided at the bottom of the receptacle and coarse sand accumulating in the bottom of the receptacle is removed by the conveyor.

4. The method of claim 3 wherein the conveyor is an upwardly tilted screw conveyor.

5. The method of claim 4 wherein solvent is caused to pass downwardly through the screw conveyor countercurrently to the coarse sand traveling upwardly through the screw conveyor.

6. The method of claim 5 wherein such solvent is fresh solvent and is introduced into the receptacle after it has passed through the conveyor.

7. The method of claim 1 wherein a portion of the solution and fine particles removed through the outlet is recycled through the flow passage to effect control over flow rate.

8. Apparatus for treating a mixture of sand and a solution of bitumen in a solvent, such mixture resulting from the extraction of tar sand with a solvent, the sand containing coarse particles and fine particles, said apparatus comprising
    (a) an upright inner vessel having a closed bottom and a first outlet close to and above the bottom for horizontal outflow of such a mixture from the inner vessel,
    (b) an outer vessel forming with the inner vessel an unobstructed passage between the two vessels extending upwardly from said first outlet, said passage having an open bottom, said outer vessel having a second outlet located above and spaced from said first outlet, and
    (c) means for causing controlled flow of such mixture through said inner vessel and first outlet into said passage, sinking at least the major portion of the coarse sand particles through said open bottom and upward flow through said passage and second outlet of solution and at least the major portion of the fine sand particles.

9. The apparatus of claim 8 including a receptacle beneath said open bottom for receiving coarse sand particles.

10. The apparatus of claim 9 including a conveyor at the bottom of the receptacle capable of continuously removing coarse sand particles.

11. The apparatus of claim 10 wherein the conveyor is an upwardly tilted screw conveyor.

* * * * *